United States Patent
Schmidt et al.

(10) Patent No.: US 6,339,668 B1
(45) Date of Patent: Jan. 15, 2002

(54) EDITING DEVICE

(75) Inventors: Adam Schmidt; Markus Hasenzahl, both of Reidstadt (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/828,237

(22) Filed: Mar. 31, 1997

(30) Foreign Application Priority Data

Apr. 12, 1996 (DE) ......................................... 196 14 408

(51) Int. Cl.[7] ................................................ H04N 5/76
(52) U.S. Cl. ............................ 386/52; 386/52; 386/55; 386/65
(58) Field of Search ............................... 386/52, 53, 55, 386/65, 96, 46; 395/500; 369/83; 345/328; 707/512; H04N 5/76

(56) References Cited

U.S. PATENT DOCUMENTS

| 4,521,870 | A | * | 6/1985 | Babbel et al. ................ 386/55 |
| 5,206,929 | A | * | 4/1993 | Langford et al. .............. 386/55 |
| 5,467,288 | A | * | 11/1995 | Fasciano et al. ............. 704/512 |
| 5,539,527 | A | * | 7/1996 | Kajimoto et al. .............. 386/52 |
| 5,563,866 | A | * | 10/1996 | Taguchi et al. ................ 369/83 |
| 5,568,275 | A | * | 10/1996 | Norton et al. ................. 385/52 |
| 5,649,171 | A | * | 7/1997 | Craven et al. .............. 395/500 |

* cited by examiner

*Primary Examiner*—Huy Nguyen
(74) *Attorney, Agent, or Firm*—Gregory L. Thorne

(57) ABSTRACT

An editing device (2) for editing video and/or audio data stored in a data storage device (1), in which at least the video data are marked by means of assigned timecode data, and in which the editing device (2) creates an editing list (3) during editing is characterized in that, during the creation of a new editing list (3), the editing device (2) marks the data provided for an editing section alternatively in conformity with the timecode data assigned to these data in the data storage device (1), or with reference to at least a part of at least one, already existing editing list (5) in which the same data have already been marked, while one of the modes of creation is selectable for the respective editing section within an editing list (3) to be created, but both modes of creation are usable in a mixed form within the editing list (3).

11 Claims, 1 Drawing Sheet

EDITING DEVICE

BACKGROUND OF THE INVENTION

The invention relates to a device for editing video and/or audio data stored in a data storage device, in which at least the video data are marked by means of assigned timecode data, and in which the editing device creates an editing list during editing.

Such editing devices are used in studios as well as by consumers for editing video data and audio data often assigned to these video data which are stored in a data storage device, for example, a magnetic tape apparatus or a memory disc for a data-processing apparatus. Editing is herein understood to mean that the video data and possibly assigned audio data are noted in an editing list section by section and possibly also in a rearranged sequence. The data in the editing list are marked by means of timecode data which are assigned to the video data and are also stored in the data storage device. Several editing sections are provided in the editing list. Two timecode values are generally introduced for each editing section, namely the timecode value of the first picture of the video data of the editing section and the timecode value of the last picture of these data. Random access, also in a rearranged sequence, is provided to the video data stored in the data storage device. If necessary, a plurality of videotakes stored in the data storage device may be accessed. With reference to the editing list, the data are read from the data storage device via a display process, in conformity with the timecode values introduced in the editing list, and are either displayed directly or stored by means of another storage device.

Known editing devices operate in such a way that, during creation of the editing list, they are always directly oriented on the timecode data which are assigned to the video data in the data storage device.

SUMMARY OF THE INVENTION

It is an object of the invention to improve an editing device of the type described in the opening paragraph in such a way that the composition of an editing list is simplified.

According to the invention, this object is solved in that, during the creation of a new editing list, the editing device marks the data provided for an editing section alternatively in conformity with the timecode data assigned to said data in the data storage device, or with reference to at least a part of at least one, already existing editing list in which the same data have already been marked, while one of the modes of creation is selectable for the respective editing section within an editing list to be created, but both modes of creation are usable in a mixed form within the editing list.

The editing device according to the invention provides two possibilities of marking the video data individually for each editing section to be marked by these data. On the one hand, there is the known possibility of dealing with the video data for an editing section with reference to the timecode data assigned to the video data stored in the data storage device. Thus, if a given section of video data in the data storage device is to be assigned to an editing section, then the corresponding timecode start and end values assigned to the video data in the data storage device are noted in the editing list.

Moreover, the editing device according to the invention provides the possibility of marking an editing section in such a way that reference is made to at least a part of an existing editing list. In this case, the data are not directly taken over from the data storage device, but reference is made to the editing list. The timecode start and end values can then be taken over in the new editing list to be created for that part of the video data which is to be taken over in this new list. This part to be taken over from the existing editing list may comprise a plurality of different sections from the video data of the data storage device. This section may thus already comprise various takes of previously composed video data.

Due to this reference to an existing, complete editing list, or to a part of such an existing editing list, a considerable part of data, and hence of elaborate operations in the creation of lists, can be saved for the new editing list to be created, because the parts taken over from an existing editing list need not be composed again.

In practice, this provides the advantage that, for example, contributions already composed can be taken over completely or partly in new contributions to be created, without these contributions themselves having to be composed again with reference to the video and timecode data stored in the data storage device.

There may be random selection between these two modes of marking the data within an editing list. This means that both modes can be mixed within an editing list. However, it should be fixed for each individual editing section which marking mode should be used for this editing section.

An embodiment of the invention is characterized in that the editing device marks the data provided for an editing section with reference to an existing editing list in such a way that exclusively the existing editing list is referred to for the relevant editing section in the editing list to be created.

To intensify the above-mentioned advantages, it is sufficient for those editing sections, for which there should be a reference to at least a part of an existing editing list, to refer exclusively to this existing editing list or to the part of the existing editing list and the timecode data introduced in this list. Advantageously, further information is not stored so as to realize a simple creation of the new editing list.

Another embodiment of the editing device is characterized in that basic lists for data and time codes assigned thereto exist in this editing device, and in that the editing device refers to the basic lists for marking the data provided for an editing section in conformity with the timecode data assigned to these data in the data storage device.

The above-mentioned, known possibility, in which editing sections mark the video data directly in conformity with the timecode data assigned to the video data in the data storage device, is further improved in that basic lists comprising the timecode data assigned to the video data already exist in the editing device for the video data stored in the data storage device. These basic lists thereby quasi-represent a kind of image of the timecode values in the way in which they are stored in the data storage device. The advantage for the editing device is that the timecode values stored in the editing device can be directly referred to for the editing process and the creation of the editing list, so that access to the data storage device is not necessary.

A further embodiment of the invention is characterized in that the editing device performs a non-linear editing operation.

Non-linear editing has become conventional practice for editing processes in cooperation with data storage devices which have very small access times, for example, disc memories for data-processing installations or personal computers. These have the advantage that much shorter waiting times for composing the individual takes occur when creating the editing list, and that only very short or no visible waiting times occur in the display process, i.e. when working through the editing list, so that, for example, for a contribution which is ready for transmission, temporary storage before transmission is not necessary, but the contribution can be directly composed and displayed with reference to the data of the editing list during transmission. Particularly for such professional purposes, the advantages of the editing device according to the invention become especially manifest because they provide a further time-saving facility.

Another embodiment of the display device according to the invention is characterized in that the display device reads the video data from the data storage device in conformity with the data introduced in the editing list, while, dependent on the mode of reference provided for the editing section, the video data for each editing section are read either in conformity with the timecode data assigned to the video data in the data storage device and introduced in the editing section, or in conformity with a reference to at least a part of an existing editing list.

In the one case, the display device reads the video data with reference to the timecode data introduced in the editing list in conformity with the assignment of these timecode data to the video data in the data storage device. In the other case, the display device is oriented on the existing editing list to which reference is made. This editing list comprises the required data, and the video data are read from the data storage device with reference to these data.

These and other aspects of the invention are apparent from and will be elucidated with reference to the embodiments described hereinafter.

DESCRIPTION OF THE PREFERRED EMBODIMENTS

Figure 1:
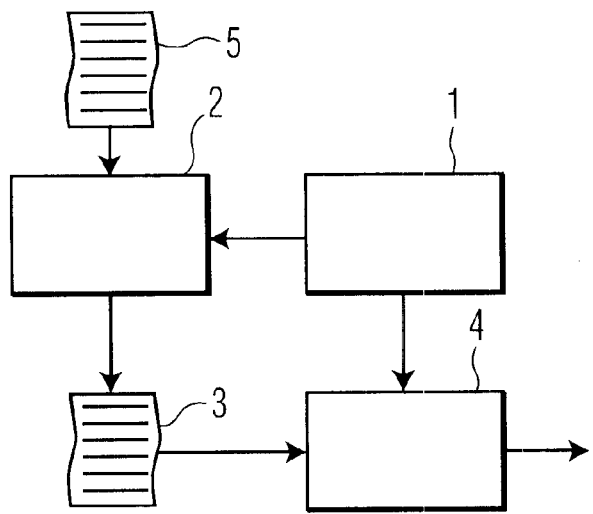
FIG. 1 shows diagrammatically the cooperation between an editing device, a data storage device, a display device, an editing list which has already been created and an editing list which is to be created.

FIG. 1 shows diagrammatically a data storage device 1 in which video and possibly assigned audio data as well as possible further data are stored. The video data are marked by timecode data.

An editing device 2 may access these data which are stored in the data storage device 1. The editing device 2 is used for creating so-called editing lists which indicate individually for editing sections which video data are to be displayed in conformity with the editing section.

FIG. 1 shows a previously created editing list 5 and a currently created editing list 3 in a symbolic form.

A display device 4 shown in FIG. 1 may access the currently created editing list 3 as well as the data which are stored in the data storage device 1.

In the creation of an editing list, the editing device 2 may directly mark the video data to be marked for an editing section in this editing section with reference to the timecode data assigned to the video data in the data storage device 1.

However, it is alternatively possible to access the data of an editing list 5 which has already been created. This selection is individually possible for each editing section.

This means that, in the editing list 3 to be currently created, either reference is directly made in an editing section to the timecode data which are assigned to the video data in the data storage device 1, or that reference is made completely or partly to an existing editing list 5. At least when partially referring to an existing editing list, the start and end timecode values of that part of the existing editing list which is to be taken over in the new editing list 3 to be created should be taken over in this new editing list 3.

These two modes of reference may be mixed within an editing list, but one mode of reference should be fixed for each, individual editing section.

For working through the data or displaying them in conformity with such an editing list, the display device 4 reverts to the data of the editing list 3 and of the previously created editing list 5. If a reference to the previously created editing list 5 is introduced in the currently created editing list 3 for an editing section, then the display device 4 reverts to the data of the existing editing list 5 for this editing section. In both cases, the corresponding video data are released from the data storage device 1 with reference to the data of the editing lists 3 or 5. The display device presents these data at the output.

In devices which are suitable for non-linear editing, this display process may be performed so rapidly that temporary storage in a further storage device is not necessary.

Figure 2:
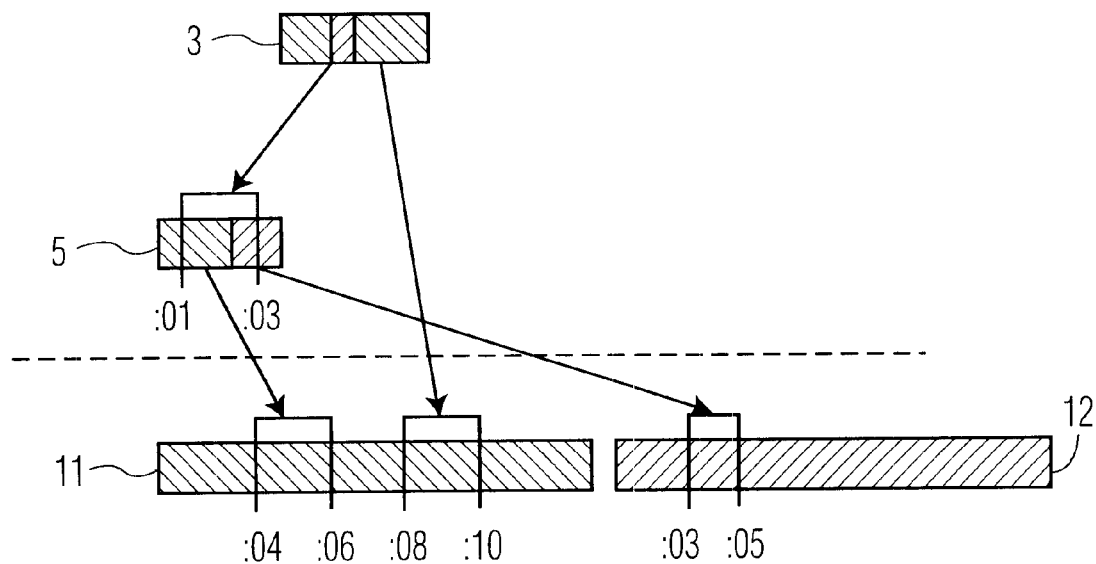
FIG. 2 shows diagrammatically some video data and assigned timecode data which are stored in a data storage device or have been marked in editing lists which have already been created, or are marked in editing lists which are to be created.

The creation of an editing list will be elucidated with reference to FIG. 2, in which both reference modes are mixed.

FIG. 2 shows two video sections 11 and 12 whose data are stored in the data storage device 1 shown in FIG. 1. Timecode data, which are also stored in the data storage device 1 of FIG. 1, are assigned to these video sections 11 and 12.

In FIG. 2, these video sections 11 and 12 are not incorporated completely but only partially in an editing list 3 to be created.

The corresponding segments of the video sections 11 and 12 are marked by timecode start and end values in FIG. 2. In the video section 11, the segments are marked by timecode values :04 to :06 and :0.8 to :0.10. The segments of the video section 12, marked by timecode values :03 to :05, should be taken over in the new editing list 3 to be created. The segment :04 to :06 of the first video section 11 and the segment :03 to :05 of the second video section 12 are only partially introduced into the new editing list 3 to be created.

As is shown diagrammatically in FIG. 2, a previously created editing list 5 already exists in which the segment :04 to :06 of the video section 11 and the segment :03 to :05 of the video section 12 have already been taken over. Since these sections should also be partially taken over in the new editing list 3 to be created, reference is made to the existing editing list 5 for an editing section of the new editing list 3 to be created. The editing sections composed in the existing editing list 5 are, however, taken over only partially. FIG. 2 shows that only the timecode section :01 to :03 of the existing editing list 5 is to be taken over. For this section, a corresponding reference is made in the new editing list 3 to be created.

The segment :08 to :10 of the first video section 11 is directly marked by referring to the timecode values, stored in the data storage device, for the new editing list 3 to be created.

In the very simple example shown in FIG. 2, a reference to a part of the existing editing list 5 will only be necessary for the first editing section of the new editing list to be created. This part comprises two video data segments which are comprised in the two video data sections 11 and 12 in the form in which they are stored in the data storage device. By referring to the existing editing list 5, an otherwise required, single reference to the two segments in the video data sections 11 and 12 is not necessary. Already in these simple examples, an otherwise twofold reference to timecode data in conformity with the storage in the data storage device is substituted for a single reference to one existing editing list. It will be evident that existing editing lists will generally comprise considerably more segments than in the simple example shown in FIG. 2. Then, an even greater simplification is achieved in the creation of the new editing list 3.

What is claimed is:

1. A device for editing video data, comprising:
    a data storage device configured to store the video data, and to store timecode data corresponding to said video data; and
    an editing device configured such that during the creation of a new editing list, in a first mode of operation, an editing section is created which defines a video segment of said video data by reference to an already existing editing list rather than by reference to said stored timecode data.

2. A device as claimed in claim 1, wherein said editing section refers to the existing editing list in such a way that exclusively the existing editing list is referred to for identifying the video segment defined by said editing section.

3. A device as claimed in claim 1, wherein said data storage device is further configured to store basic lists for the video data and time codes corresponding thereto, and in that the editing device is configured to refer to said basic lists for creating said another editing section.

4. A device as claimed in claim 1, wherein said editing device is further configured to perform a non-linear editing operation.

5. A device as claimed in claim 1, further comprising a display device configured to display the video data stored in said data storage device in conformity with the new editing list and configured to read the video data from the data storage device in conformity with editing sections in the new editing list, and being dependent on the mode of reference used in each editing section, the video data for each editing section being read either in conformity with timecode data identified in the editing section, or in conformity with timecode data identified in an existing editing list referred to in the editing section.

6. The device of claim 1, wherein said editing device is further configured such that in a second mode of operation another editing section of the new editing list is created in which another video segment of said video data is defined by reference to said stored timecode data.

7. A method for editing video data stored in a data storage device, in which the video data are marked by means of assigned timecode data, and in which an editing list is created during editing, said method comprising the steps of, during the creation of a new editing list defining a video segment of said video data with an editing section in a first mode by referring to at least a part of at least one already existing editing list, and optionally defining another video segment of said video data with another editing section in a second mode by referring to the timecode data assigned to said data in the data storage device.

8. The method of claim 7, in which the step of defining a video segment with an editing section in a first mode refers to the existing editing list in such a way that exclusively the existing editing list is referred to in the relevant editing section of the new editing list.

9. The method of claim 7, wherein basic lists for data and time codes assigned thereto exist and the optional step of defining another video segment in a second mode utilizes said basic lists for creating said another editing section.

10. The method of claim 7, further comprising the step of performing a non-linear editing operation.

11. The method of claim 7, further comprising the steps of:
    reading the video data from the data storage device in conformity with the editing sections of the new editing list and in dependence upon the mode of reference used for each editing section, and
    displaying the read video data.

* * * * *